(12) United States Patent
Teramoto

(10) Patent No.: US 6,490,419 B2
(45) Date of Patent: Dec. 3, 2002

(54) DATA RECORDING DEVICE AND CAMERA SYSTEM

(75) Inventor: Tougo Teramoto, Wakayama (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/923,453

(22) Filed: Aug. 8, 2001

(65) Prior Publication Data

US 2002/0021898 A1 Feb. 21, 2002

(30) Foreign Application Priority Data

Aug. 10, 2000 (JP) ........................................ 2000-242535

(51) Int. Cl.[7] ..................... G03B 17/24; G03B 17/00; G03B 7/00
(52) U.S. Cl. ..................... 396/321; 396/310; 396/532; 396/211
(58) Field of Search ................. 396/532, 300, 396/211, 321, 310, 530, 299, 311, 312, 315, 544, 91, 72

(56) References Cited

U.S. PATENT DOCUMENTS 5,752,106 A * 5/1998 Yamano ...................... 396/263
5,895,127 A 4/1999 Yamamoto
6,167,208 A * 12/2000 Sato ........................ 348/207.99

FOREIGN PATENT DOCUMENTS

| JP | 04-347976 | 12/1992 |
|---|---|---|
| JP | 09-037131 | 2/1997 |
| JP | 10-020387 | 1/1998 |

* cited by examiner

Primary Examiner—Russell Adams
Assistant Examiner—Andrew Sever
(74) Attorney, Agent, or Firm—McDermott, Will & Emery

(57) ABSTRACT

The camera system comprises a camera and a data-recording device. The camera has a mount for attaching the photo-taking lens and this mount can also be used for attaching the data-recording device by way of the data-recording device's mounting member. The camera has a recording medium inside it for recording photo-taking information. When the data-recording device is attached, photo-taking information can be transmitted by communication members in both the camera and data-recording device to a recording medium contained in the data-recording device.

20 Claims, 9 Drawing Sheets

DATA RECORDING DEVICE AND CAMERA SYSTEM

This application is based on application No. 2000-242535 filed in Japan, the content of which is hereby incorporated by reference.

FIELD OF THE INVENTION

The present invention relates to a camera system that handles electronic data, and more particularly, to a camera system having a data recording device that communicates with a camera capable of recording photo-taking data including character data and sound data, as well as image data, and that records the data recorded in the camera in an external recording medium.

DESCRIPTION OF THE RELATED ART

A device that uses a memory card comprising a recording medium on which photo-taking data is recorded, and that comprises a camera having a card holder in which the memory card may be housed, has conventionally been proposed. In addition, a camera having a simple detachable rear cover has also been proposed, wherein a separately available rear cover has a data recording device and may be exchanged with the simple rear cover, enabling photo-taking data to be recorded in this data recording device.

However, the above conventional devices have the following problems.

In the former related art, all cameras must have a card holder that houses a memory card, which imposes a burden on the user in terms of size and cost of the camera.

In the latter related art, the mentioned function is achieved by replacing the rear cover of the camera with a rear cover that has a photo-taking data recording device. However, because the configuration of the rear cover of a camera varies from one model to another, the photo-taking data recording device must be designed to fit each model, which entails numerous development processes. In addition, the user also must purchase a rear cover that includes a data recording device for each camera, which is economically burdensome.

SUMMARY OF THE INVENTION

An object of the present invention is to provide a camera system with increased applicability.

The present invention provides a camera system having the following construction in order to resolve the technical problems described above.

The camera system comprises a camera and a data recording device that may be detachably mounted to the camera. The camera has a first mounting member to which the photo-taking lens may be detachably mounted, a first communication member that communicates with the photo-taking lens mounted on the first mounting member, and a first recording member that records photo-taking information in a built-in or detachable first recording medium. The data recording device has a second mounting member that may be detachably mounted to the first mounting member of the camera, a second communication member that, when the data recording device is mounted to the first mounting member of the camera via the second mounting member, reads out the photo-taking information recorded in the first recording medium of the camera through communication with the first communication member of the camera, and a second recording member that records the photo-taking information that has been read out by the second communication member in a detachable or built-in second recording medium.

In the above construction, the camera records photo-taking information, such as the captured image data itself, information regarding the captured image (character data representing the shutter speed, aperture and photo-taking lens information, sound data including comments regarding the location or object of the photo-taking, etc.) to the first recording medium via the first recording member. The data recording device may be mounted to and detached from the first mounting member of the camera, on which the photo-taking lens is mounted. When the data recording device is mounted to the camera, it communicates with the camera, reads at least part of the photo-taking information recorded in the first recording medium of the camera, and records it in the second recording medium of the data recording device.

Using the above construction, the data recording device may be used on various types of cameras if the camera is compatible in regard to the first mounting member to which the photo-taking lens is mounted. In addition, because the data recording device uses for its communication with the camera the existing first communication member of the camera that is used for communication with the photo-taking lens, it is not necessary to equip the camera with new signal terminals, offering the advantage of a smaller space requirement and a reduction in the size of the camera.

Therefore, the present invention can provide a camera system with increased applicability.

The present invention also provides a camera system having the following. construction.

The camera system comprises a camera and a data recording device that may be detachably mounted to the camera. The camera has a first mounting member to which the photo-taking lens may be detachably mounted, a first communication member that communicates with the photo-taking lens mounted on the first mounting member, and a first recording member that records photo-taking information in a built-in or detachable first recording medium. The data recording device has a second mounting member that may be detachably mounted to the first mounting member of the camera, a second communication member that, when the data recording device is mounted to the first mounting member of the camera via the second mounting member, reads out the photo-taking information recorded in the first recording medium of the camera through communication with the first communication member of the camera, and a communication member that transmits the photo-taking information read out by the second communication member to a different device via wireless communication.

In the above construction, when the data recording device is mounted to the camera, it communicates with the camera, reads out at least part of the photo-taking information recorded in the first recording medium of the camera, and transmits it to a different device.

Using the above construction, the data recording device may be used on various types of cameras if the camera is compatible in regard to the first mounting member to which the photo-taking lens is mounted. In addition, because the data recording device uses for its communication with the camera the existing first communication member of the camera that is used for communication with the photo-taking lens, it is not necessary to equip the camera with new signal terminals, offering the advantage of smaller space requirements and a reduction in the size of the camera.

Therefore, the present invention can provide a camera system with increased applicability.

In the above construction, the first recording medium may comprise a built-in (integrated) memory member, such as a RAM, or a detachable recording medium.

In the above construction, the second recording medium preferably comprises a detachable semiconductor memory or a detachable recording medium using the magnetic recording method or photomagnetic recording method.

Generally, a recording medium in which data write may be performed at high speed is expensive, but if a high-speed but small-capacity first recording medium and a low-speed but large-capacity second recording medium are used, high-speed processing may be performed during photo-taking, while the second recording medium may be kept low in cost and easy to handle.

The first communication member of the camera preferably communicates with the second communication member of the data recording device using a method different from the method used when it communicates with the photo-taking lens.

Because the amount of information transmitted is different between when the camera communicates with the photo-taking lens and when the camera communicates with the data recording device, by using different communication methods, efficient communication may be obtained in either case.

The camera preferably transmits identification information by which to identify the camera to the second communication member of the data recording device via the first communication member. The second recording member of the data recording device records the photo-taking information in the second recording medium while associating it with the transmitted identification information. The camera or data recording device has a display member that displays with priority the photo-taking information recorded in the second recording medium and associated with the identification information for the camera to which the data recording device is mounted.

Using the above construction, because the data recording device records the photo-taking information while associating it with the camera identification information, even if the data recording device is used on different multiple cameras, it can separately record the information regarding each camera. The information regarding photo-taking performed by the multiple different cameras and recorded in the data recording device is displayed in the display member of the camera or the data recording device, with priority on the camera to which the data recording device is currently mounted. Consequently, such operations as recording and deletion of the photo-taking information for the camera to which the data recording device is currently mounted and which has the highest frequency of recording and deletion operations in connection with the data recording device may be immediately performed while viewing the display member, offering convenience.

The data recording device preferably has a sound input member by which the sound data input from the sound input member is recorded in the second recording medium via the second recording member.

Using the above construction, sound may be input using the data recording device, and sound data such as comments regarding the location and object of the photo-taking may be recorded. While it is desirable that the data recording device be used on its own, i.e., without being mounted to the camera, it may be used while being mounted to the camera. In addition, the sound input member may be integrated into the data recording device or may be detachably mounted to it. Where the sound input member is detachably mountable, it may be mounted to the second mounting member of the data recording device.

The data recording device preferably has a communication member by which to communicate with other devices via wireless communication.

Using the above construction, the information read out from the first recording medium and the information read out from the second recording medium may be transmitted to different devices, or the information received from a different device may be recorded in the second recording medium. The communication member may be integrated into the data recording device or may be detachably mounted to it. Where the communication member is detachably mountable, it may be mounted to the second mounting member of the data recording device, for example.

It is further preferred that the communication member comprise a communication unit that may be detachably mounted to the data recording device. This communication unit includes a third mounting member by which to mount the communication unit to the second mounting member of the data recording device, and a third communication member that communicates with the second communication member of the data recording device when the communication unit is mounted to the second mounting member of the data recording device via the third mounting member.

The camera preferably has a communication member by which to communicate with other devices via wireless communication.

For example, communication may be performed between cameras having a communication feature, such that (i) the information recorded in one camera may be transmitted to a different camera to which a data recording device is mounted, and (ii) information may be recorded in the data recording device. One data recording device may be shared among multiple cameras, offering convenience.

It is preferred that the size of the data recording device essentially match the diameter of the photo-taking lens mounted to the first mounting member of the camera.

Using the above construction, because the size of the data recording device essentially matches that of the photo-taking lens, it is small and lightweight, and easy to carry. In addition, it is easy to carry the device while it is mounted to a camera. The data recording device offers great portability with a size equivalent to a small photo-taking lens, and may be housed in a camera holder as if it were an integrated part of the camera while being mounted to the camera in place of the photo-taking lens.

The present invention also provides a data recording device used in the camera system of each of the above constructions.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The camera system comprising a first embodiment will be explained with reference to FIGS. 1A through 4. The camera system of the first embodiment has a data recording device that is mounted to a silver halide camera and that incorporates and records the photo-taking data recorded in the recording medium integrated in the silver halide camera.

Figure 1A:
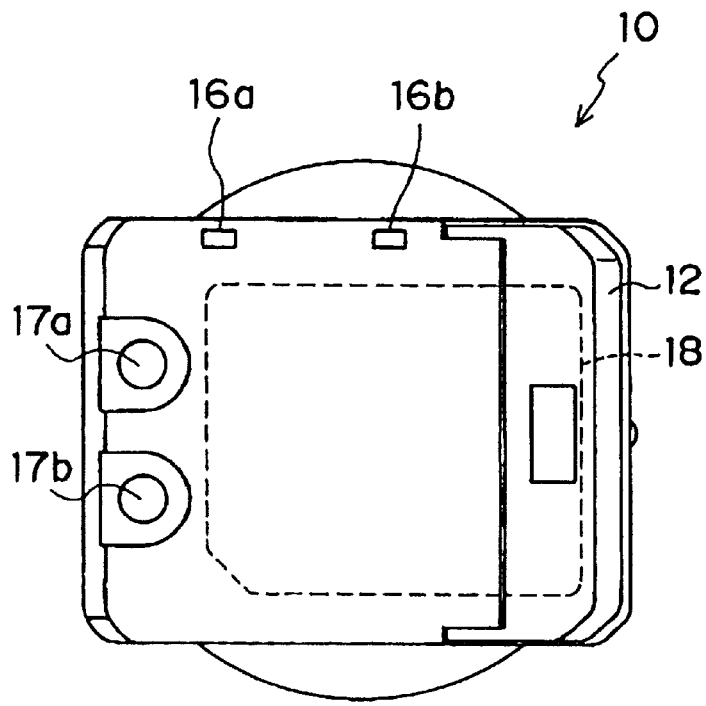
FIGS. 1A, 1B and 1C show the external view of a data recording device used in the camera system comprising a first embodiment of the present invention.
Figure 1B:
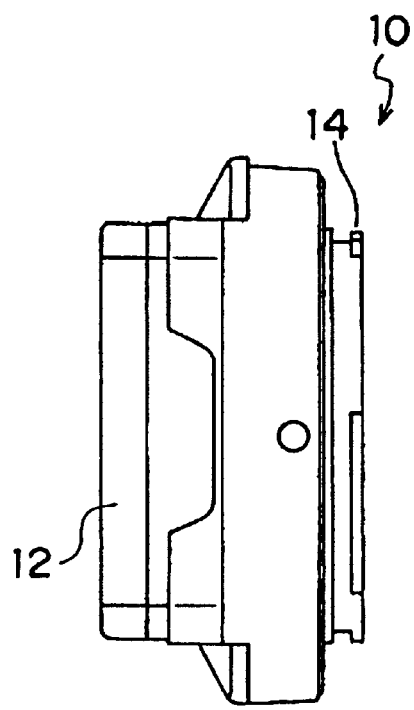
Figure 1C:
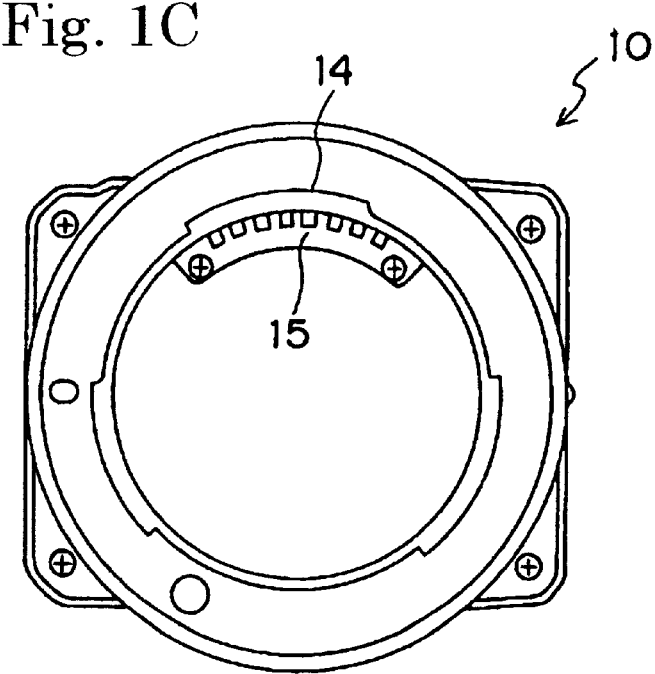

FIGS. 1A, 1B and 1C are a front elevation, side elevation and rear elevation of the data recording device 10, respectively. As shown in FIG. 1A, the data recording device 10 has on its front surface display windows 16a and 16b, each of which comprises a display member such as an LED, as well as operation buttons 17a and 17b, and as shown in FIG. 1B, the data recording device 10 has on its side surface a card cover 12 that may be opened and closed. The recording medium 18 may be mounted or removed by opening the card cover 12. A semiconductor memory (smart media, compact flash, etc.) is used as the recording medium 18. As shown in FIG. 1C, a mount 14 by which to mount the data recording device to the camera body is located on the back of the data recording device 10, and signal terminals (communication means) 15 by which to perform communication with the camera main unit are located inside the mount 14. The mount 14 and signal terminals 15 are identical to those found in the photo-taking lens that is mounted to the camera.

Figure 2:
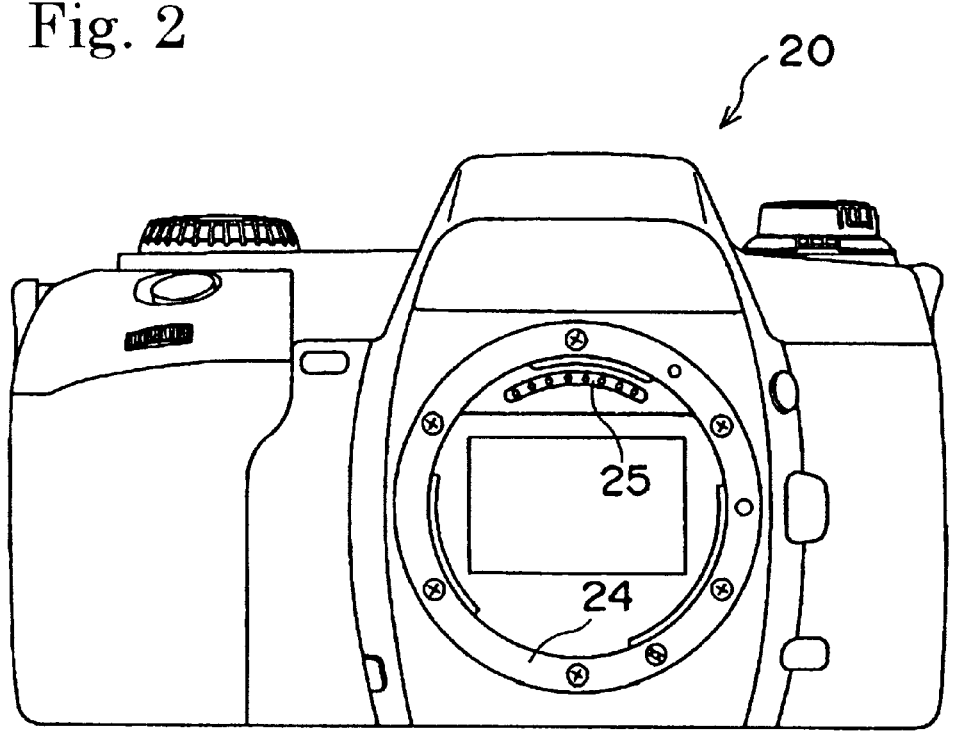
FIG. 2 is a front elevation of a silver halide camera used in the camera system comprising the first embodiment of the present invention.

FIG. 2 is a front elevation of a silver halide camera (a camera body) 20. The silver halide camera 20 has on its front surface a mount 24 to which the photo-taking lens is mounted, and signal terminals (communication means) 25 by which to perform communication with the mounted photo-taking lens are located inside the mount 24.

Figure 3:
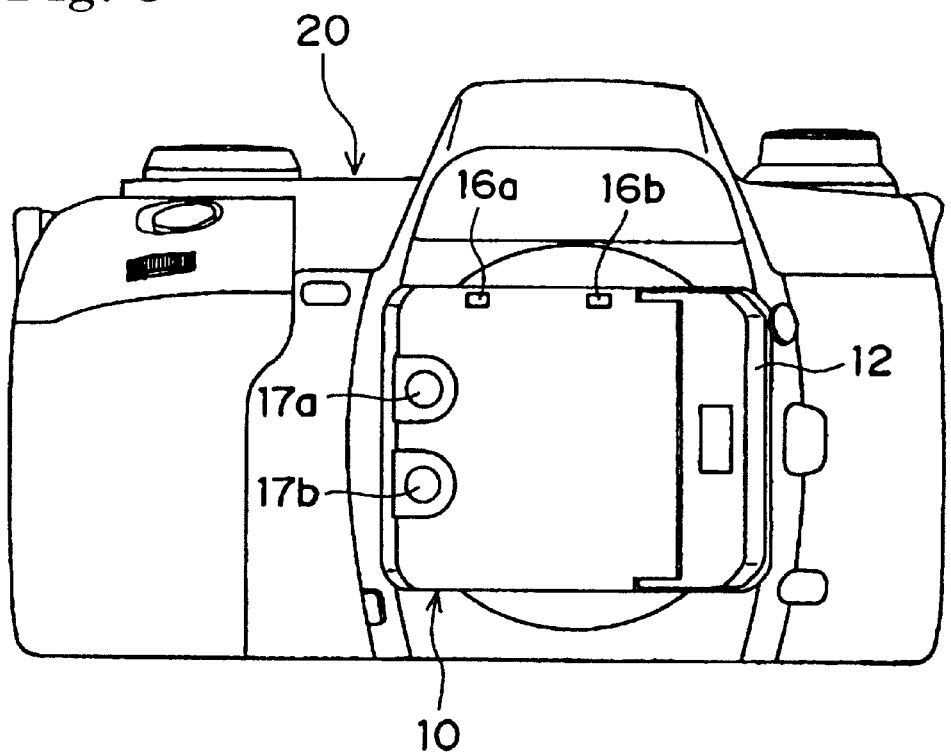
FIG. 3 is a front elevation when the data recording device is mounted to the camera.

FIG. 3 is a front elevation showing the data recording device 10 mounted to the silver halide camera 20. The mount 14 of the data recording device 10 engages with the mount 24 of the silver halide camera 20 in the same manner as the interchangeable lens.

Figure 4:
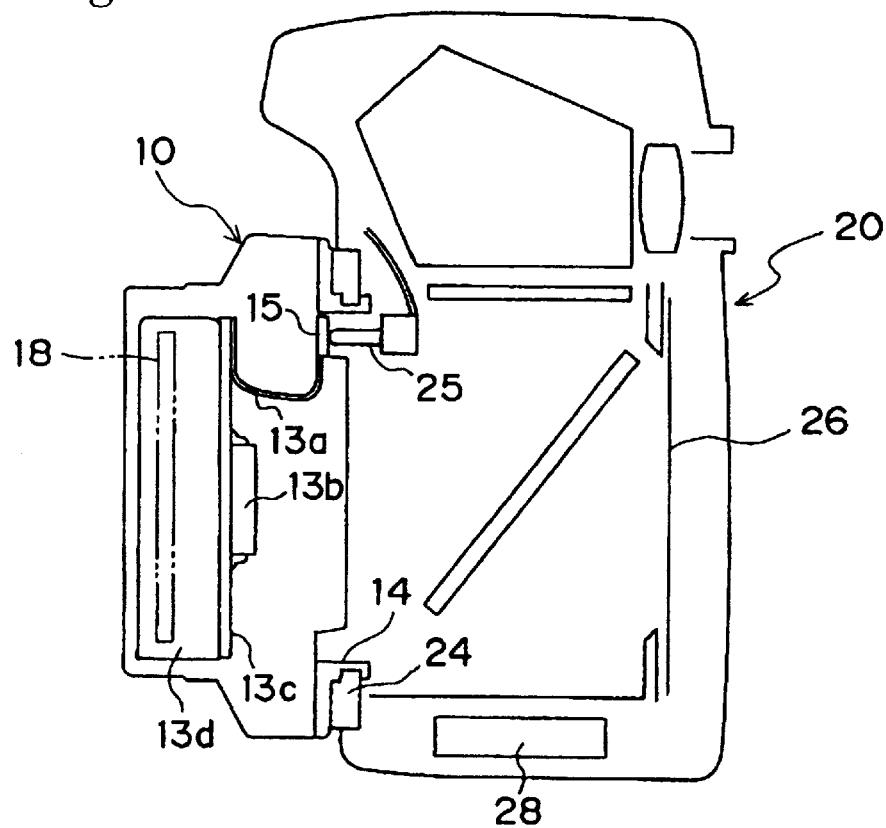
FIG. 4 is a cross-sectional view of the center of FIG. 3.

FIG. 4 is a cross-sectional view of the center of FIG. 3. The data recording device 10 includes a microcomputer 13b mounted on the substrate 13c. The microcomputer 13b controls the operation in which the data recording device 10 communicates with the camera 20, incorporates the data recorded in the recording medium 28, which is integrated in the camera 20, via the signal terminals 25 and 15 and the flexible substrate 13, and records the incorporated data in the recording medium 18 in the data recording device 10 via the connector 13d, as well as the opposite operation, i.e., the operation in which the data recorded in the recording medium 18 of the data recording device 10 is transferred to the camera.

The silver halide camera 20 records images on the film 26 through the photo-taking lens mounted to the mount 24. Photo-taking information regarding the film frames in which images are captured, including the character data regarding the shutter speed, aperture value and lens focal length, for example, is recorded in the built-in recording medium 28. An E2PROM, flash memory, etc. is used for the recording medium.

The data recording device 10 itself does not have an independent power supply. Power is supplied from the camera 20 via some of the signal terminals 25 of the silver halide camera 20. When power is supplied to the data recording device 10, the microcomputer 13b communicates with the microcomputer (not shown in the drawings) of the camera 20, and where communication is performed normally, a green light is lit in the display window 16a. Where there is any abnormality, a red warning light is lit in the display window 16a.

When the recording button 17a is pressed, the silver halide camera 20 recognizes that the data transfer mode has been activated. The photo-taking data recorded in the silver halide camera 20 is transferred to the data recording device 10 from the recording medium 28 via the signal terminals 25 and 15 and the flexible substrate 13. The circuit of the data recording device 10 writes the incorporated photo-taking data into the detachable recording medium 18. A green light flashes in the display window 16a during data transfer.

If the recording button 17a is pressed when the recording capacity of the recording medium 28 of the silver halide camera 20 exceeds the remaining capacity of the recording medium 18 of the data recording device 10, a yellow warning light flashes in the display window 16a. In this case, if the recording button 17a is continuously kept pressed for a specified period of time, the recording mode is activated, such that the new data is overwritten over the old data and all of the data in the silver halide camera 20 is recorded in the recording medium 18 of the data recording device 10.

The transfer of data to a personal computer from a silver halide camera, which has an integrated recording medium in which photo-taking data is recorded, has conventionally been carried out using a cable connecting the two devices via a dedicated terminal member on the camera. However, this method entails the problem that, because all cameras must have a terminal member and interface circuitry, the camera increases in terms of both size and price.

Using the first embodiment of the present invention, the data recording device 10 that is mounted to the camera 20 and incorporates data uses the adapter method, and the camera 20 does not need to have a new terminal member. The existing mount 24 for mounting the photo-taking lens and the signal terminals 25 of the camera 20 are utilized for the mounting of the data recording device 10 as well.

Furthermore, the recording medium 28 of the camera 20 need not have a large capacity. It suffices if it has a capacity sufficient to record information equivalent to 20 to 50 rolls of film, which may be used in a day, for example, so that a low-cost recording medium 28 may be used and an increase in the price of the camera 20 may be prevented. On the other hand, a detachable recording medium 18 comprising a semiconductor memory such as a flash memory, for example, is used in the data recording device 10. The recording medium 18 has a large capacity, and is capable of recording data equivalent to 500 to 2,000 rolls of film.

In addition, because the data recording device 10 may be mounted to the mount 24 of the camera 20, the data recording device 10 may be shared among multiple cameras. Where it is shared among cameras having different photo-taking data files, an identification number may be specified for each camera, and by adding the identification number to the file name, identical file names may be prevented from occurring. This feature will be explained in more detail below.

The camera system comprising a second embodiment of the present invention will now be explained with reference to FIGS. 5 though 8. The second embodiment includes a data recording device that is mounted to a digital camera and that incorporates and records the photo-taking data, which includes the captured images captured in the recording medium integrated into the digital camera.

Figure 5:
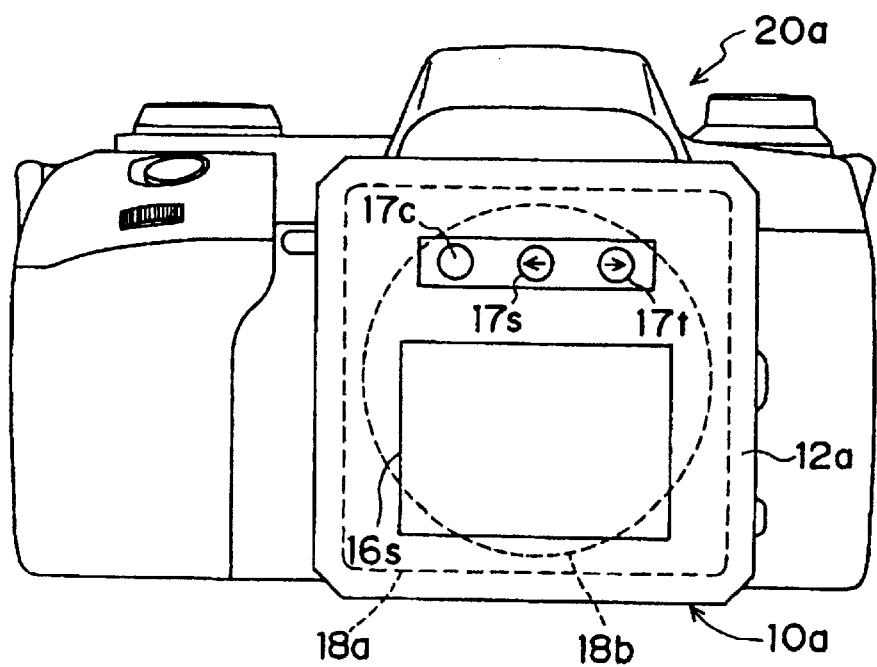
FIG. 5 is a front elevation of the camera system comprising a second embodiment of the present invention.
Figure 6:
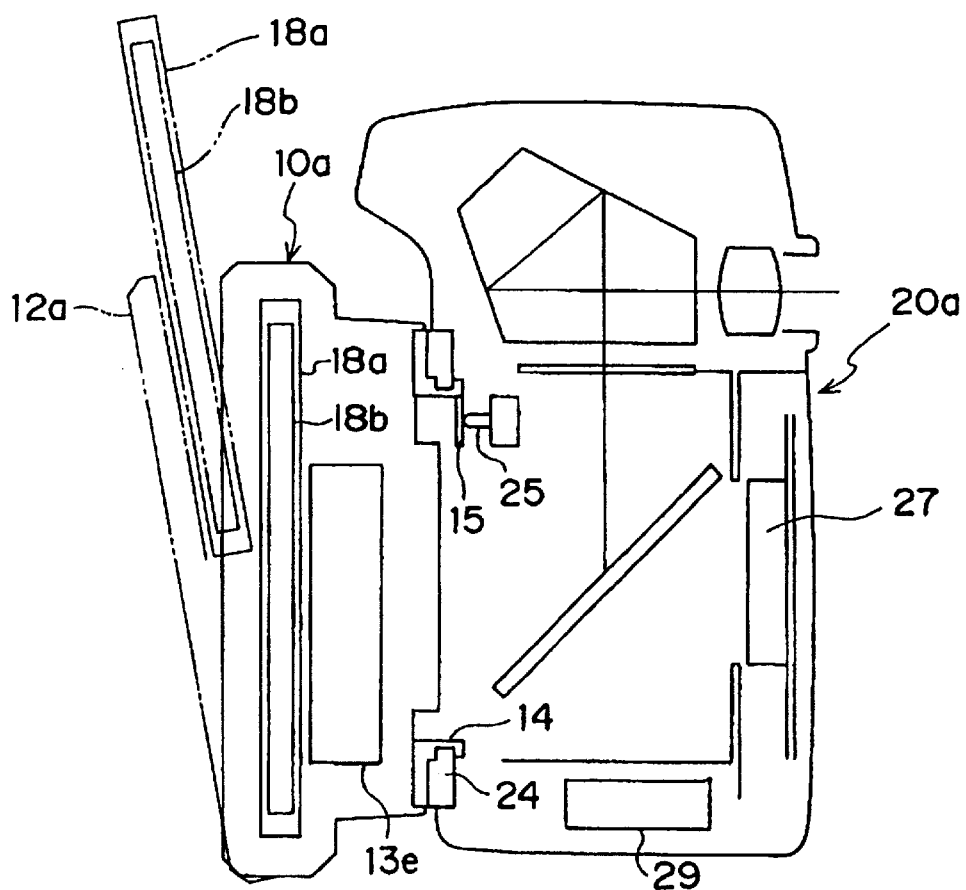
FIG. 6 is a cross-sectional view of the center of FIG. 5.

FIG. 5 shows a front elevation in which the data recording device 10a is mounted to a digital camera (a camera body) 20a. FIG. 6 shows a cross-sectional view of the center of FIG. 5.

The digital camera 20a uses an imaging element 27 in place of the film 26 in the silver halide camera 20 shown in FIG. 2. It extracts the information pertaining to the captured image as electric signals and records it in the recording medium 29. Members other than this recording member, including the mount 24 and signal terminals 25, for example, are the same as in the silver halide camera 20 of FIG. 2, and the digital camera 20a is of the single lens reflex type, enabling the photo-taking lens of the silver halide camera 20 to also be used.

The image output from the imaging element 27 is recorded as image files in the recording medium 29 by a control circuit (not shown in the drawings). The photo-taking information regarding the captured images such as character data regarding the shutter speed, the aperture value and the lens focal length, for example, is also recorded in the built-in recording medium 29. An integrated or detachable semiconductor memory or hard disk is used as the recording medium 29. The data recording device 10a has a card cover 12a on its external side, and a display member 16s, which comprises liquid crystal that displays images or characters, and operation buttons 17c, 17s and 17t are located on the card cover 12a.

The card cover 12a is constructed such that it may be opened to the position at which it allows the detachable recording medium 18a to be removed, as shown by solid lines and dotted lines in FIG. 6. A disk-configured recording medium 18b is housed inside the case of the recording medium 18a. An MO (magneto-optical disk) or MD (mini-disk) using the photomagnetic recording method is used as the recording medium 18a.

Figure 8:
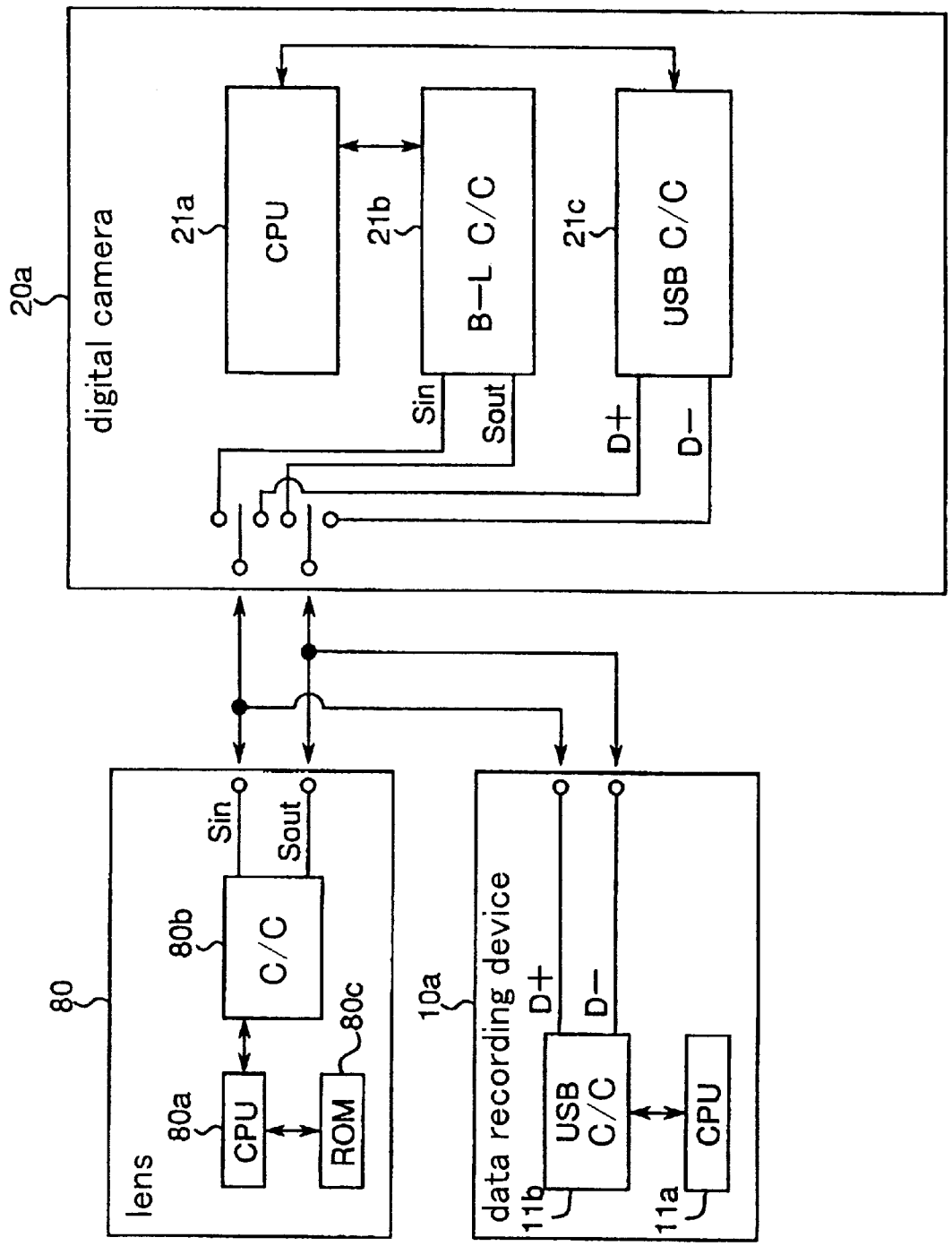
FIG. 8 is a block diagram of the camera system of FIG. 5.

FIG. 8 is a drawing to explain the switching of the function of the signal terminals. Different data communication modes are used depending on whether a photo-taking lens or the data recording device is mounted to the camera.

When the photo-taking lens 80 is mounted to the camera 20a, power is supplied to the CPU 80a and the communication circuit (C/C) 80b of the photo-taking lens 80 via some of the signal terminals 25 (not shown in the drawing), and the CPU 80a communicates with the CPU 21a of the digital camera 20a. When this occurs, two signal terminals Sin and Sout are used for the data communication between the digital camera 20a and the photo-taking lens 80. Sin is a terminal that transfers data from the lens to the camera. Sout is a terminal that transfers data from the camera to the lens. The CPU 80a reads out the information pertaining to the photo-taking lens from the ROM 80c and transmits it to the CPU 21a via the B--L communication circuit (B-L C/C) 21b of the digital camera 20a.

On the other hand, when the data recording device 10a is mounted to the camera 20a, power is similarly supplied to the CPU 11a and the USB communication circuit (USB C/C) 11b of the data recording device 10a via some of the signal terminals 25 (not shown in the drawing), and the CPU 11a communicates with the CPU 21a of the digital camera 20a. When this occurs, two signal terminals D+ and D− are used as a pair of USB operating signal terminals for the data communication between the data recording device 10a and the digital camera 20a. The CPU 11a communicates with the CPU 21a via the USB communication circuit USB C/C 21c of the digital camera 20a.

Switching of the data communication mode may be carried out manually via an operation on the camera side, or it is also acceptable if the operation of the camera is performed assuming that ordinarily a photo-taking lens is mounted, and the data communication mode is switched to USB communication only when photo-taking lens information is not transmitted to the camera.

When the data recording device 10a is mounted to the digital camera 20a, communication is performed via the signal terminals 15 and 25, and the state of the data files is shown in the display member 16s of the data recording device 10a. This display is shown in FIG. 7.

Six file names 'dn3-0123' to 'dn3-0118' are shown in the frame 16z of the display member 16s. Here 'dn3' represents the identification number for the digital camera, and the last four digits represents the file number.

Because the data recording device 10a may be mounted to multiple different digital cameras that use the same type of mount, the data must be identified in terms of the camera that was used to capture it. If two identical file names existed, the incorporation of one of such files into the data recording device 10 would overwrite the existing file, which was created using a different camera. Therefore, an ID (identification) number, which is any of 1 through 9, may be specified for each digital camera. In the example of FIG. 7, the ID number for the digital camera 20a is specified as 3, and therefore its data files have a prefix ID of 'dn3-'.

Figure 7:
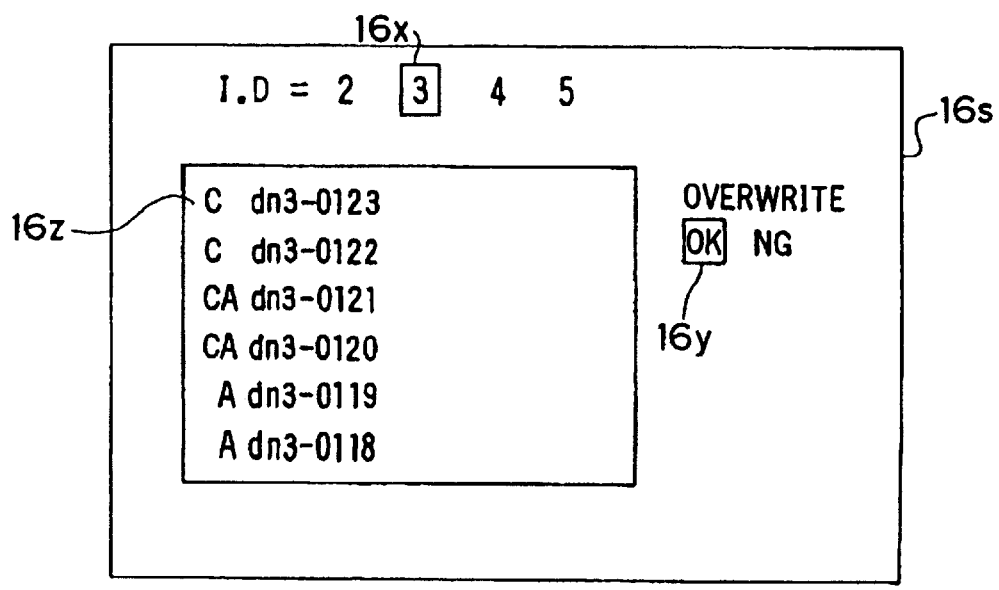
FIG. 7 is an enlarged drawing of a display member of the data recording device of FIG. 5.

The data recording device 10a also contains data incorporated from other digital cameras, and in the example of FIG. 7, it contains data from four cameras represented by ID numbers 2, 3, 4, and 5, and as shown by 16x, the number 3 is inverted.

The ID number is received through the first communication between the data recording device 10a and the digital camera 20a, and only the data for the ID number 3 is displayed on the display member 16 with priority.

Where the user wishes to see the data for any other ID number, the cursor buttons 17s and 17t are operated to invert any other ID number shown in the upper area of the display member 16s.

Furthermore, any data file 'dn3-0123' through 'dn3-0118' that has a C at the beginning of the file name comprises data recorded in the recording medium 29 of the digital camera 20a, while a file that has an A at the top of the file name comprises data recorded in the recording medium 18a of the data recording device 10a. Files with both 'C' and 'A' are displayed, indicating that data previously incorporated remains in the recording medium 29 without having been deleted.

When the recording button 17c (see FIG. 5) is pressed here, the recording mode is activated. An overwrite warning is issued regarding 'dn3-0121' and 'dn3-0120', and if overwriting is acceptable, a recording operation may be initiated by pressing the recording button 17c again because the overwrite mode is present at initialization. On the other hand, where overwrite is not acceptable, the cursor buttons 17s and 17t are operated so that the letters 'NG' will become inverted instead of the 'OK', which is shown by 16y in FIG. 7 and is inverted under 'OVERWRITE' in the screen of the display member 16s, and the recording button 17c is pressed.

The photo-taking data recorded in the recording medium 29 of the digital camera 20a is transferred to the data recording device 10a via the signal terminals 25 and 15. The circuit of the data recording device 10a writes the incorporated photo-taking data in the detachable recording medium 18a.

The digital camera 20a records the captured images as electronic signals, and because an image file generally consumes a large amount of space in the memory, the recording medium 29 must have a large capacity. However, a hard disk, which is suitable for ensuring a large memory capacity, poses the disadvantages of susceptibility to vibration and impact and relatively high cost. While a semiconductor memory does not entail these problems, it is still expensive to provide it with a large capacity, and to equip the camera with multiple memories would entail a substantial economic burden.

On the other hand, an MD or MO, which is a photomagnetic recording medium, has a large capacity, and its cost per unit is approximately one-fiftieth of that of the above memories. Other than their large size, such disks are ideal as a recording medium.

Because a small-sized semiconductor memory is used for the recording medium 29, which is integrated in or mounted to the camera 20a, the memory used in connection with the data recording device 10a of the second embodiment of the present invention is resistant to vibration and impact during photo-taking, and the camera 20a is compact in size and easy to carry. When the semiconductor memory 29 becomes full, the photo-taking lens may be removed from the digital camera 20a and replaced with the data recording device 10a, so that the entire photo-taking data pertaining to the camera 10a may be incorporated into the inexpensive, detachable recording medium 18a, and photo-taking may be continued, again.

Therefore, it is not necessary to carry multiple units of expensive semiconductor memories, offering an economic advantage.

In addition, the recording device may be used with multiple different digital cameras using the same type of mount.

For example, it is common for the type of recording medium used by a camera to vary from one camera to another, and in such a case, an adapter suited to each recording medium is necessary in order to incorporate data into a personal computer. However, using the data recording device 10a of the present invention, it is possible to incorporate the data into the recording medium 18a of the data recording device 10a regardless of the type of the recording medium 29 of the camera 20a, such that only one type of adapter that accommodates the data recording device 10a suffices as the adapter used for connection to the personal computer.

In addition, because an identification number may be specified for each digital camera 20a, even if data from multiple cameras is recorded, different data having the same file name is not overwritten. Further, by receiving the identification number for the camera, the data for that camera 20a only may be displayed in the display member 16s of the data recording device 10a or the display member of the camera 10a to which the data recording device 10a is mounted.

The camera system comprising a third embodiment will now be explained with reference to FIGS. 9 through 11. In the third embodiment, the data recording device may not only be mounted to the camera and incorporate the phototaking data recorded in the recording medium of the camera, but may also be used as a sound recording device when it is removed from the camera.

Figure 9:
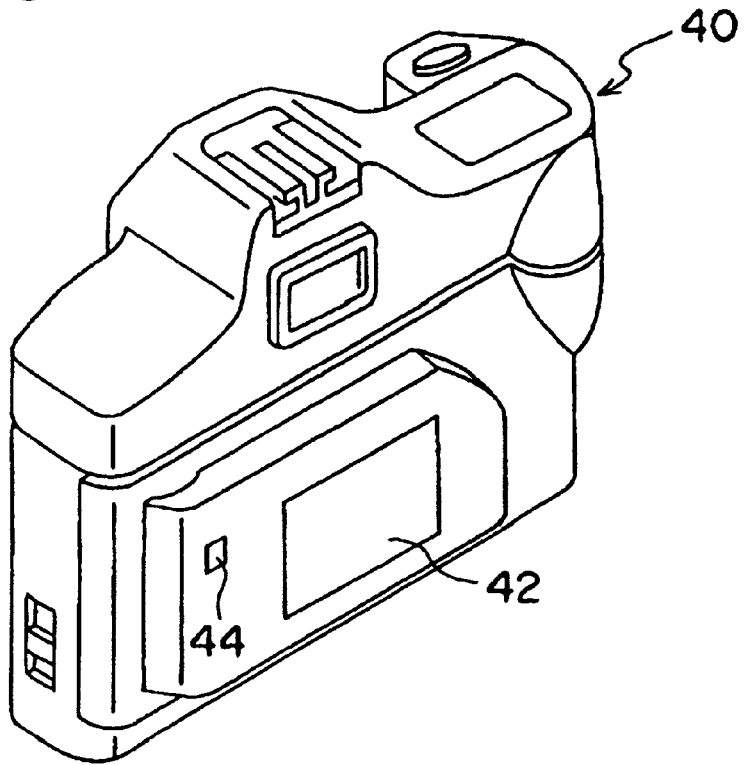
FIG. 9 is a perspective view of a camera used in the camera system comprising a third embodiment of the present invention.

FIG. 9 shows a perspective view of the rear side of a camera 40 that can communicate with the data recording device 30 via infrared. The camera 40 may comprise a silver halide camera or a digital camera. On the rear surface of the camera 40 are located a display member 42 comprising liquid crystal, etc., and an infrared communication window 44.

Figure 10:
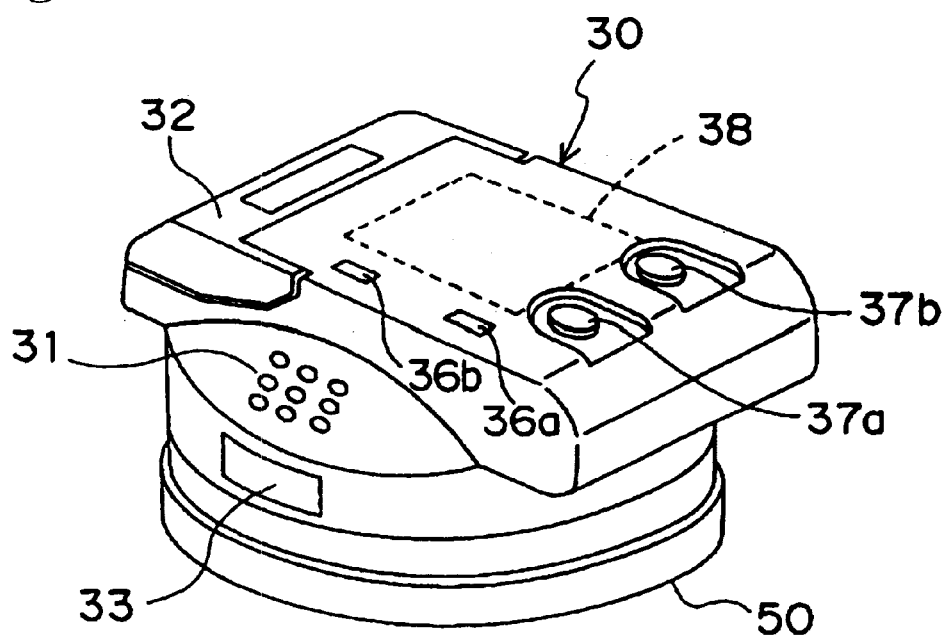
FIG. 10 is a perspective view of a data recording device used in the camera system comprising the third embodiment of the present invention.

FIG. 10 shows a data recording device 30. Like the data recording device 10 shown in FIG. 1, it has on its front surface display windows 36a and 36b comprising display members such as LEDs and operation buttons 37a and 37b. The data recording device 30 has on its side surface a card cover 32 that may be opened and closed, such that a recording medium 38 may be mounted and removed by opening the card cover 32. The data recording device 30 has a mount and signal terminals on its rear surface, though they are not shown in the drawing. The data recording device 30 has an infrared communication window 33 and a microphone 31, unlike the data recording device 10 shown in FIG. 1.

Figure 11:
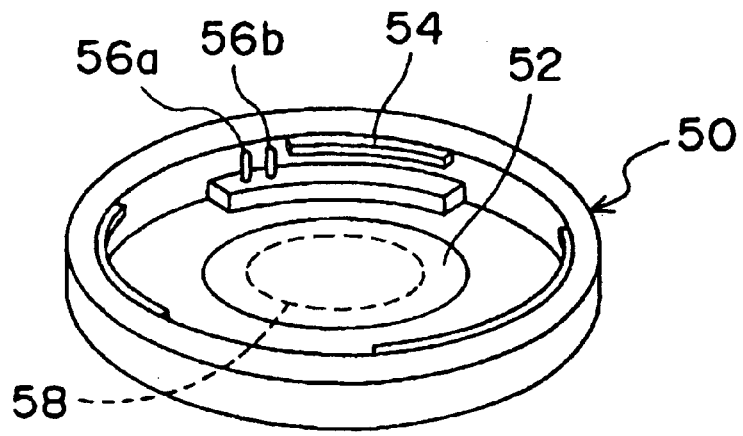
FIG. 11 is a perspective view of a cap mounted to the data recording device of FIG. 10.

FIG. 11 shows a cap 50 that is mounted to the rear surface of the data recording device 30. Inside the cap 50 is located a cover 52, such that a battery 58 may be housed inside the cap 50. 56a and 56b are power supply terminals. They are connected to those terminals among the signal terminals of the data recording device 30 that receive power supply, and supply power to the data recording device 30.

As shown in FIG. 10, the cap 50 is mounted to the data recording device 30 when it is removed from the camera 40. The cap 50 protects the signal terminals of the data recording device 30 from dust and supplies power to the data recording device 30.

The data recording device 30 may be used as a sound recording device as well. When the data recording device is mounted to the camera 40, the button 37a functions as a data write button, but where the data recording device 30 is used on its own, as shown in FIG. 10, the button 37a acts as a sound recording button. In other words, if the user speaks while pressing the button 37a, the sound is incorporated via the microphone 31, converted into electric signals and recorded in the recording medium 38 as a sound file.

However, the sound file thus recorded cannot be matched with the film frames regarding which images are captured via the camera 40 (or the image files in the case of a digital camera).

In order to resolve this shortcoming, the camera 40 and the data recording device communicate with each other, for example, and identification information regarding the film frame or image file for which photo-taking was performed is received by the data recording device 30, which records the sound file while associating it with the identification information. In order to implement this feature, the camera 40 has an infrared communication window 44 on its rear surface and the data recording device has an infrared communication window 33.

When the data recording device 30 is mounted to the camera 40, the photo-taking data is incorporated into the data recording device 30 from the recording medium of the camera 40 in the same manner as in the first embodiment, and is recorded in the recording medium 38 together with the sound file.

In contrast with the first embodiment, it is also acceptable if the sound file is transferred from the data recording device 30 to the camera 40, such that the sound file may be recorded in the recording medium of the camera 40 while being associated with the identification information.

Figure 12:
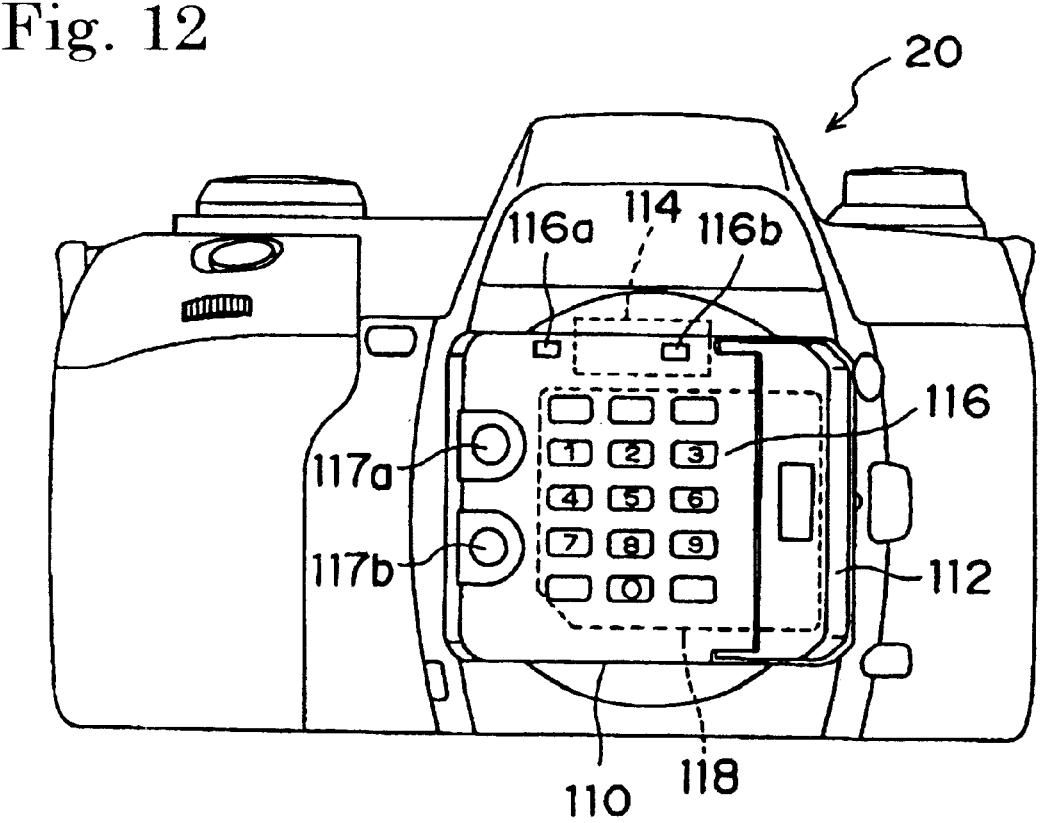
FIG. 12 is a front elevation of the camera system comprising a fourth embodiment of the present invention.

The camera system of a fourth embodiment of the present invention will now be explained with reference to FIG. 12. The data recording device serves as a portable terminal with a communication function, and can transmit and receive data to and from a digital camera or silver halide camera having a communication function.

Like the data recording device 10 shown in FIG. 1, the data recording device 110 has on its front surface display windows 116a and 116b comprising display members such as LEDs, as well as operation buttons 117a and 117b, and has on its side surface a card cover 112 that may be opened and closed, such that a recording medium 118 may be mounted and removed by opening the card cover 112. The data recording device 110 includes on its rear surface a mount and signal terminals that are not shown in the drawing, such that it may be mounted to the camera 20. When it is mounted to the camera, the data recording device 110 incorporates the photo-taking data including the captured images recorded in the recording medium integrated into the camera, and records the data in the recording medium 118.

Unlike the data recording device 10 shown in FIG. 1, the data recording device 110 has a chip antenna 114 and a cellular phone operation button 116, such that it serves as a portable terminal having a communication function, and can transmit and receive data to and from a digital camera or sliver halide camera having a communication function.

Figure 13:
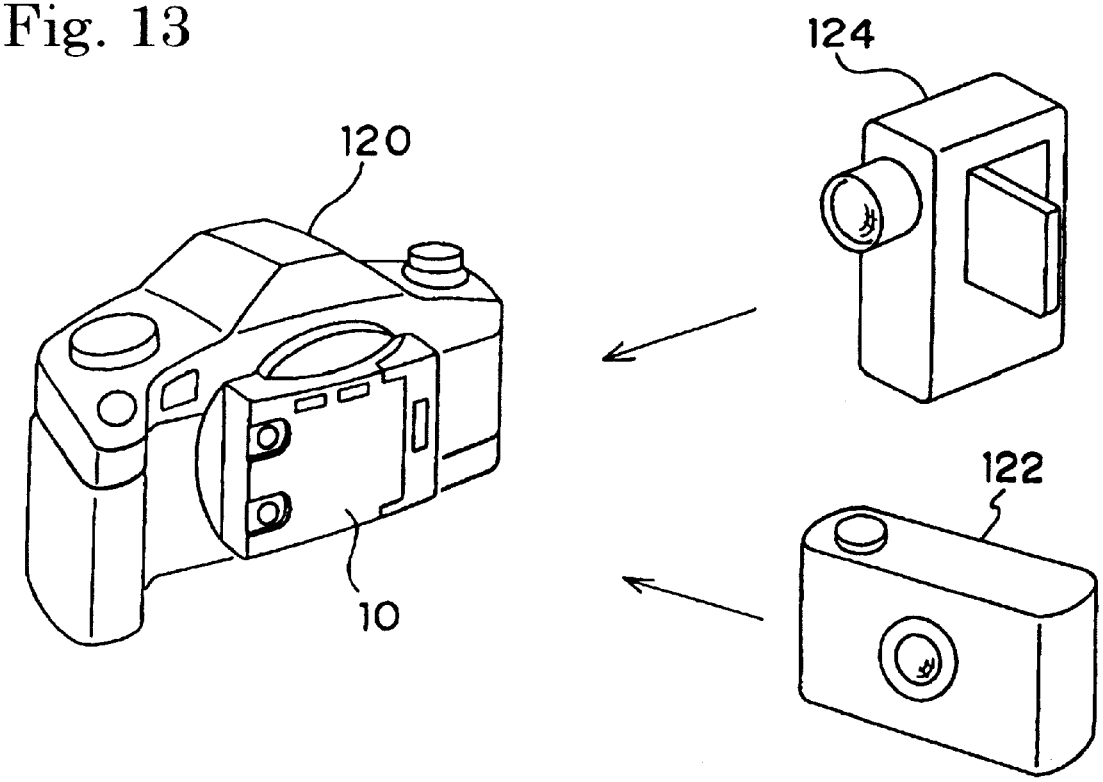
FIG. 13 is a drawing showing the construction of the camera system comprising a fifth embodiment of the present invention.

A fifth embodiment of the present invention will now be explained with reference to FIG. 13. The fifth embodiment combines a camera and a data recording device, both of which have a communication function.

Technologies such as 'BlueTooth', which makes devices that can communicate via telephone lines, connecting cables, LANs or infrared devices capable of communication based on short-distance wireless data communication are known. Combining these devices 120, 122 and 124 having this wireless communication function, image data captured by the digital camera 122 and moving images that are being captured or have already been captured by the digital video camera 124 may be transferred as data to the camera 120 to which the data recording device 10 of FIG. 1 is mounted, such that the data is recorded in the recording medium 18 of the data recording device 10.

The lens rear cap-type communication terminal unit for the data recording device comprising a sixth embodiment of the present invention will now be explained with reference to FIGS. 14 through 16.

Figure 14:
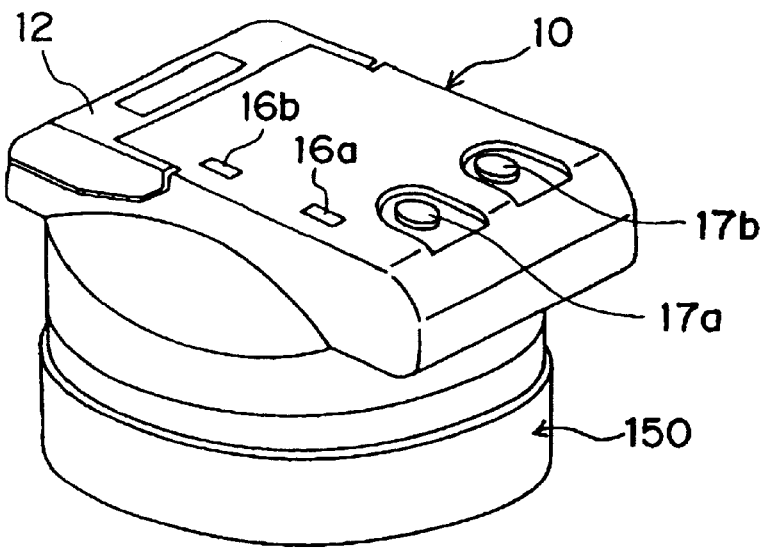
FIG. 14 is a perspective view of a data recording device comprising a sixth embodiment of the present invention.
Figure 15:
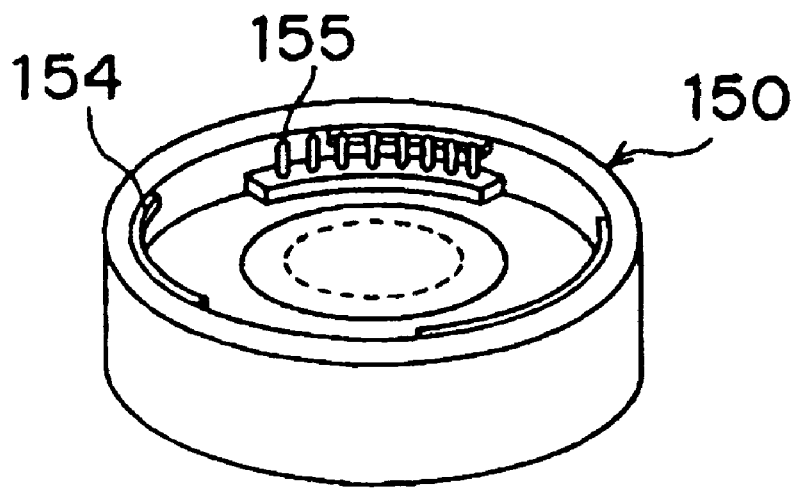
FIG. 15 is a perspective view of a communication terminal unit mounted to the data recording device of FIG. 14.

As shown in FIG. 14, the communication terminal unit 150 may be mounted to the mount 14 of the data recording device 10 of FIG. 1.

The communication terminal unit 150 has a mount 154, which has the same structure as the mount 24 of the camera 20, as well as signal terminals (communication means) 155, and may be mounted to the mount 14 of the data recording device 10, such that the communication terminal unit 150 can communicate with the data recording device 10 via the signal terminals 15 and 155.

Figure 16:
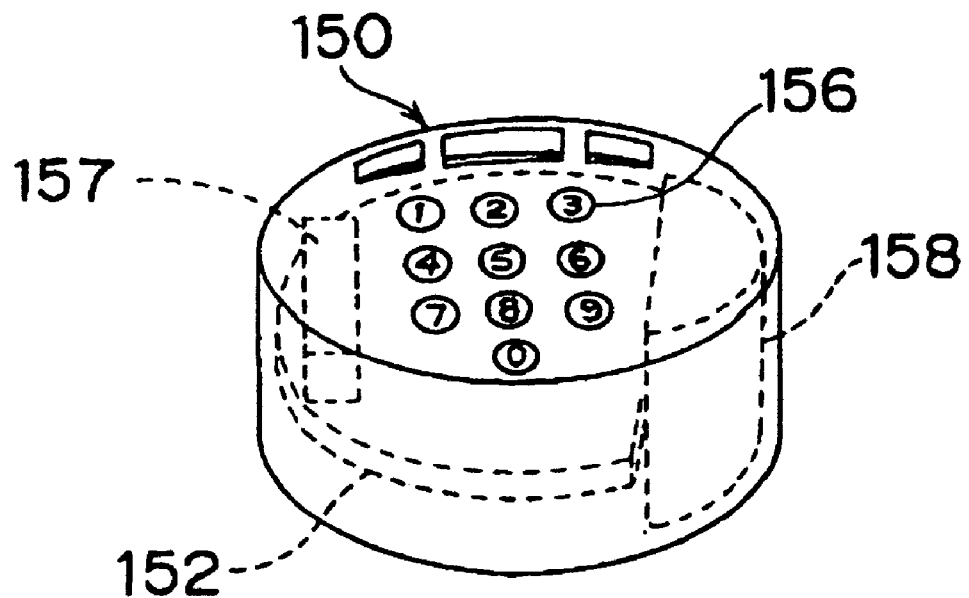
FIG. 16 is a perspective view of the communication terminal unit mounted to the data recording device of FIG. 14.

Located on the rear surface of the communication terminal unit 150 are buttons 156 used for communication, as shown in FIG. 16. Located inside the communication terminal unit 150 are a substrate 152, which includes a communication circuit, a chip antenna 157, and a battery 158.

Mounting the communication terminal unit 150 to the data recording device 10 enables the data recording device to communicate with other devices, such that the data recorded in the data recording device 10 can be transferred to a peripheral device such as a personal computer via the communication terminal unit 150. The data recording device 10 can also communicate via the communication terminal unit 150 with a camera having a communication function, and receive photo-taking data from the camera to record it in the recording medium of the data recording device 10.

As explained above, the data recording device may be mounted to the lens mount of the camera, and uses the signal terminals that are ordinarily used for communication between the camera and the lens. Therefore, if the camera is mount-compatible, a signal data recording device may be shared among multiple different cameras regardless of the model, and the economic burden on the user may be reduced. In addition, because the signal terminals, which are ordinarily used for communication between the camera and the photo-taking lens, are used for the communication between the camera and the data recording device, it is not necessary to equip the camera with a new signal terminal unit, offering smaller space requirements and helping to reduce the size of the camera. Furthermore, because the data recording device is as small as a small interchangeable lens, it may be housed in the camera case as if it were an integral part of the camera, and it is easy to carry.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A camera system including a camera body and a data recorder, said system comprising:
   a first mount provided within said camera body for attaching a photo-taking lens;

a first terminal provided within said camera body for communicating with the photo-taking taking lens attached on the first mount;

a first memory provided within said camera body and recording photo-taking information;

a second mount provided within said data recorder and attachable to the first mount;

a second terminal provided within said data recorder and contactable with the first terminal when the second mount is attached to the first mount; and a second memory provided within said data recorder and receiving the photo-taking information from the first memory through the first terminal and the second terminal.

2. The camera system according to claim 1, wherein the second memory is detachable from said data recorder.

3. The camera system according to claim 1, wherein the second memory is a semiconductor memory or a recording medium using the magnetic recording method or photomagnetic recording method.

4. The camera system according to claim 1, wherein the first memory is a RAM.

5. The camera system according to claim 1, wherein the camera body communicates with the photo-taking lens by a first communication system and the camera body communicates with the data recorder by a second communication system.

6. The camera system according to claim 1, further comprising a controller which transmits identification information of the camera body from the camera body to the data recorder.

7. The camera system according to claim 6, wherein the second memory records the photo-taking information while associating it with the transmitted identification information.

8. The camera system according to claim 7, further comprising a display that displays with priority the photo-taking information recorded in the second memory and associated with the identification information for the camera body to which the data recorder is mounted.

9. The camera system according to claim 1, wherein the data recorder has a sound input member and the second memory records the sound data inputted from the sound input member.

10. The camera system according to claim 1, wherein the data recorder has a communication member by which to communicate with other devices via wireless communication.

11. The camera system according to claim 10, wherein the communication member is detachable from the data recorder.

12. The camera system according to claim 11, wherein the communication member includes a third mount by which to mount the communication member to the second mount.

13. The camera system according to claim 1, wherein the camera body has a communication member by which to communicate with other devices via wireless communication.

14. The camera system according to claim 1, wherein the size of the data recorder match the diameter of the photo-taking lens mounted to the first mount of the camera. Body.

15. A camera system including a camera body and a communication unit, said system comprising:

a first mount provided within said camera body for attaching a photo-taking lens;

a first terminal provided within said camera body for communicating with the photo-taking taking lens attached on the first mount;

a memory provided within said camera body and recording photo-taking information;

a second mount provided within said communication unit and attachable to the first mount;

a second terminal provided within said communication unit and contactable with the first terminal when the second mount is attached to the first mount; and a communication member provided within said communication unit, receiving the photo-taking information from the memory through the first terminal and the second terminal and transmitting the photo-taking information to other devices.

16. The camera system according to claim 15, wherein the camera body communicates with the photo-taking lens by a first communication system and the camera body communicates with the communication unit by a second communication system.

17. The camera system according to claim 15, further comprising a controller which transmits identification information of the camera body from the camera body to the communication unit.

18. The camera system according to claim 15, wherein the communication unit communicates with other devices via wireless communication.

19. A data recorder comprising:

a mount which attachable to a camera mount of a camera body, wherein the camera mount is for attaching a photo-taking lens;

a terminal which receives photo-taking information from the camera body; and a memory which records the photo-taking information.

20. The data recorder according to claim 19, wherein the memory is detachable.

* * * * *